US011307298B2

(12) United States Patent
Miller (10) Patent No.: US 11,307,298 B2
(45) Date of Patent: Apr. 19, 2022

(54) POSITION, NAVIGATION, AND TIMING (PNT) METHODS AND SYSTEMS

(71) Applicant: Raytheon Company, Waltham, MA (US)

(72) Inventor: Kenneth V. Miller, Rancho Cucamonga, CA (US)

(73) Assignee: Raytheon Company, Waltham, MA (US)

( * ) Notice: Subject to any disclaimer, the term of this patent is extended or adjusted under 35 U.S.C. 154(b) by 273 days.

(21) Appl. No.: 16/676,823

(22) Filed: Nov. 7, 2019

(65) Prior Publication Data

US 2020/0182990 A1 Jun. 11, 2020

Related U.S. Application Data

(60) Provisional application No. 62/776,016, filed on Dec. 6, 2018.

(51) Int. Cl.
*G01S 13/28* (2006.01)
*G01S 13/20* (2006.01)
(Continued)

(52) U.S. Cl.
CPC ............ *G01S 13/288* (2013.01); *G01S 13/20* (2013.01); *H04B 17/318* (2015.01)

(58) Field of Classification Search
CPC ................................ H01Q 21/29; H04B 13/00
See application file for complete search history.

(56) References Cited

U.S. PATENT DOCUMENTS 5,041,834 A 8/1991 Koert
7,519,136 B2* 4/2009 Qi .................. H04W 64/00
375/316
(Continued)

OTHER PUBLICATIONS

PCT International Search Report and Written Opinion dated Mar. 25, 2020 for International Application No. PCT/US2019/060879; 18 Pages.
(Continued)

*Primary Examiner* — Bernarr E Gregory
(74) *Attorney, Agent, or Firm* — Daly Crowley Mofford & Durkee, LLP (57) ABSTRACT

The present disclosure relates to position, navigation and timing (PNT) methods, systems, and transmitters. A method comprises receiving radio-frequency (RF) signals from a plurality of virtual transmitters and determining PNT information of a target object based on information obtained from the RF signals. A system comprises a plurality of virtual transmitters and a receiver. The plurality of virtual transmitters is configured to transmit radio-frequency (RF) signals that include PNT information. The receiver is configured to determine PNT information of a target object based on the PNT information. A transmitter comprises a high-frequency (HF) carrier generator, a waveform generator, and an antenna system. The HF carrier generator generates an HF carrier signal. The waveform generator generates a waveform that includes PNT information. The antenna system transmits the HF carrier signal to generate a subject ionospheric duct. The antenna system is further configured to transmit the waveform through the ionospheric duct.

16 Claims, 6 Drawing Sheets

(51) Int. Cl.
*H04B 17/318* (2015.01)
*G01S 13/00* (2006.01)

(56) References Cited

U.S. PATENT DOCUMENTS

| | | | |
|---|---|---|---|
| 7,899,467 B2* | 3/2011 | Feuerstein | G01S 5/0273 |
| | | | 455/456.1 |
| 9,363,784 B1* | 6/2016 | Friday | H04B 17/318 |
| 9,935,724 B1* | 4/2018 | Cooper | H04B 17/3912 |
| 10,194,278 B1* | 1/2019 | Kusens | G01S 5/0252 |
| 2006/0044176 A1* | 3/2006 | Papadopoulos | H04B 13/00 |
| | | | 342/1 |
| 2010/0103046 A1 | 4/2010 | Smith et al. | |
| 2013/0178229 A1 | 7/2013 | Henry et al. | |
| 2015/0029058 A1 | 1/2015 | Robey | |
| 2016/0223637 A1* | 8/2016 | Gentner | G01S 5/0273 |
| 2017/0273008 A1* | 9/2017 | Friday | G01S 5/0273 |

OTHER PUBLICATIONS

International Preliminary Report on Patentability dated Jun. 17, 2021 for International Application No. PCT/US2019/060879; 11 Pages.

Federal Aviation Administration, "Loran's Capability to Mitigate the Impact of a GPS Outage on GPS Position, Navigation, and Time Applications;" Prepared for the Federal Aviation Administration Vice President for Technical Operations Navigation Services Directorate; Mar. 2004; 109 Pages.

Hartshorn et al., "Performance of Loran-C $9^{th}$ Pulse Modulation Techniques;" Proceedings of the 2006 National Technical Meeting of the Institute of Navigation; Jan. 18, 2006; pp. 384-395; 14 Pages.

Rodriguez et al., "The High Frequency Active Auroral Research Program;" 2004 Navy Research Laboratory Review, Chapter: Atmospheric Science and Technology; May 2004; pp. 106-108; 3 Pages.

* cited by examiner

POSITION, NAVIGATION, AND TIMING (PNT) METHODS AND SYSTEMS

CROSS REFERENCE TO RELATED APPLICATIONS

The present application claims the benefit of U.S. Provisional Patent Application No. 62/776,016, filed on Dec. 6, 2018, which is incorporated herein by reference.

BACKGROUND

Positioning, navigation, and timing (PNT) information are provided by navigation systems. Positioning information enables a receiver to accurately and precisely determine its location and orientation two-dimensionally (i.e., latitude and longitude) or three-dimensionally (latitude, longitude, and altitude). Navigation information allows a receiver to determine its current and desired position and apply corrections to course, orientation, and speed to attain a desired position anywhere around the world. Timing information allows a receiver to acquire and maintain accurate and precise time (e.g., Coordinated Universal Time (UTC)), anywhere in the world.

Global Positioning System (GPS) is a global navigation satellite system that provides PNT capabilities for military, civil, and commercial users around the world. Thus, should GPS become compromised or rendered inoperable the impact would be disastrous. For instance, terrestrial based PNT systems cannot operate over air or sea.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In one aspect, a method comprises receiving radio-frequency (RF) signals from a plurality of virtual transmitters. The method also comprises determining position, navigation, and/or timing (PNT) information of a target object based on information obtained from the RF signals.

In an embodiment, the method further comprises generating the plurality of virtual transmitters using a plurality of ionospheric ducts. The method can also comprise selecting a number of virtual transmitters to enclose a geographic area in which PNT information is to be provided. Each virtual transmitter can be associated with a distinct ionospheric duct.

In additional embodiments, the method also comprises generating the ionospheric ducts using a high-frequency (HF) carrier signal having a predetermined frequency and amplitude. The method can further comprise selecting the predetermined frequency and amplitude to heat a plasma area in which the ionospheric ducts are generated.

In further embodiments, the method comprises transmitting a waveform through one of the ionospheric ducts. The RF signals transmitted by the virtual transmitters includes the waveform and the waveform comprises the PNT information. The plurality of virtual transmitters can comprise a virtual primary transmitter and one or more virtual secondary transmitters. The waveform corresponding to the virtual primary transmitter comprises a series of pulses with one of the pulses being modulated to include PNT data. The PNT data can comprise one or more of: station ID, UTC time, timing corrections, and virtual transmitter locations.

In another aspect, a system provides position, navigation, and timing (PNT) information. The system comprises a plurality of virtual transmitters and a receiver. The plurality of virtual transmitters is configured to transmit radio-frequency (RF) signals that include PNT information. The receiver is configured to determine PNT information of a target object based on the PNT information.

The system can also comprise a transmitter configured to generate the plurality of virtual transmitters using a plurality of ionospheric ducts. The transmitter can comprise a high-frequency (HF) carrier generator and an antenna system The HF carrier generator is configured to generate an HF carrier signal having a predetermined frequency and amplitude. The antenna system is configured to transmit the HF carrier signal to generate a subject ionospheric duct. The predetermine frequency and amplitude can be selected to heat a plasma area in which the subject ionospheric duct is generated.

The HF carrier generator can further be configured to control a phase of the antenna system to steer the HF carrier signal such that the subject ionospheric duct impacts a predetermined point on earth. The predetermined point on earth corresponds to a location of one of the virtual transmitters. The predetermined points on earth for the plurality of virtual transmitters are selected to enclose a geographic area in which PNT information is to be provided.

The transmitter can further comprise a waveform generator configured to generate a waveform that includes the PNT information. The antenna system can accordingly be configured to transmit the waveform through one of the ionospheric ducts.

The plurality of virtual transmitters can comprise a virtual primary transmitter and one or more virtual secondary transmitters. The waveform corresponding to the virtual primary transmitter can comprises a series of pulses with one of the pulses modulated to include PNT data.

In other aspects, a transmitter comprises a high-frequency (HF) carrier generator, a waveform generator, and an antenna system. The HF carrier generator is configured to generate an HF carrier signal having a predetermined frequency and amplitude. The waveform generator is configured to generate a waveform that includes PNT information. The antenna system is configured to transmit the HF carrier signal to generate a subject ionospheric duct that impacts a predetermined point on earth to generate a virtual transmitter. The antenna system is further configured to transmit the waveform through the ionospheric duct which is transmitted to a target object by the virtual transmitter.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In the event of a massive solar flare, or other such event, global positioning systems (GPS) could be rendered inoperable. Without GPS, GPS-based systems may not operate properly or at all. Additionally, GPS system does not operate well in polar regions (and some other dead zone areas) and will not provide navigation to submerged elements.

Figure 1:
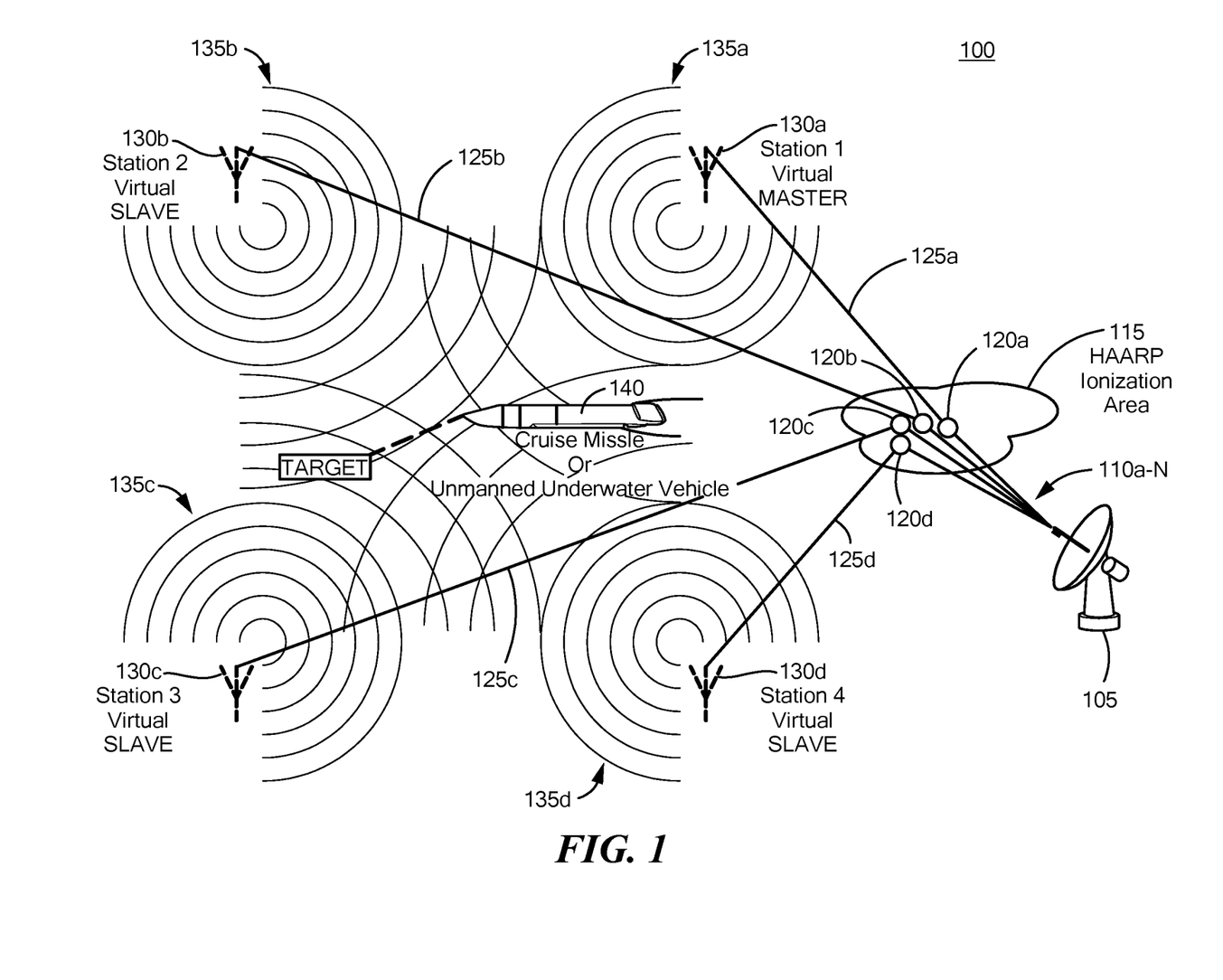
FIG. 1 illustrates a position, navigation, and timing (PNT) system according to embodiments described herein.

FIG. 1 illustrates a position, navigation, and timing (PNT) system 100 that can be used in combination with, or in lieu of, a GPS. The PNT system 100 comprises an ionospheric transmitter 105 that generates virtual transmitters 130a-d for providing information to a receiving target 140. Although the PNT system 100 illustrates four (4) virtual transmitters, a skilled artisan understands that the PNT system 100 can comprise any practical number of transmitters to provide PNT information to the receiving target 140.

The ionospheric transmitter 105 is configured to generate ionospheric ducts 120a-d within an ionization (or plasma) area 115. The ionization area 115 is located within the ionosphere. In embodiments, the ionization area 115 can be selected based on a frequency to be used for PNT transmissions by the virtual transmitters, an ionization area (size) needed, and an elevation required to create a duct (e.g., one of ducts 120a-d) that will reach an intended location of any of the virtual transmitters 130a-d. Specifically, the ionospheric transmitter 105 generates and transmits high frequency signals 110a-N that heat up the ionization area 115 to generate a plurality of ionospheric ducts 120a-d. Each of ducts 120a-d impacts a different location of the Earth's surface. To create the ionization area 115, the transmitter 105 transmits a carrier wave having a frequency selected based on a level of ionization and altitude of the ionization area. In examples, the frequency range for the carrier wave can be between 2 and 10 MHz. The carrier wave can also have an amplitude (power level) based on what is necessary to maintain a stable ionization area. For example, such stability can be determined based upon reflections of the carrier wave. In embodiments, the reflections can be received at a ground level that is below a level of the transmitter's site.

Accordingly, each of the ionospheric ducts 120a-d provide a signal pathway 125a-d from the ionosphere to a location on the Earth's surface. The ionospheric transmitter 105 then generates and transmits a plurality of waveforms, with each waveform being transmitted through a different one of the ionospheric ducts 120a-d. As such, the waveforms impinge the Earth's surface to create each of the virtual transmitters 130a-d. In embodiments, the waveforms have a frequency that is within the low frequency (LF) or very low frequency (VLF) ranges (e.g., 10-500 KHz). Advantageously, the LF and VLF bands are not influenced by propagation issues as are higher frequencies (e.g. 1.5 to 60 MHz) since LF and VLF signals are primarily ground waves. Ground waves, also referred to as surface waves, are signals that travel along the ground/sea and that are not reflected off the ionosphere. Additionally, ground waves characteristically suffer negligible dispersion. Further, LF/VLF frequencies are relatively unaffected by solar/geomagnetic disturbances and have excellent propagation characteristics during the day or night.

The virtual transmitters 130a-d transmit signal pulses 135a-d that carry PNT information. The virtual transmitters 130a-d comprise a primary virtual transmitter 130a and one or more secondary virtual transmitters 130b-d. The virtual transmitters 130a-d are positioned to provide Position, Navigation and Timing (PNT) information in a selected area for a period of time. For example, the area may be selected to encompass a current location of a guided munitions and systems, a target/area of operations, and any location therebetween. Accordingly, the virtual transmitters 130a-d can be separated by several hundred miles.

In embodiments, the primary virtual transmitter 130a and the secondary virtual transmitters 130b-d transmit a master pulse signal 135a and secondary pulse signals 135b-d, respectively. The pulsed signals 135a-d are described in greater detail in FIGS. 3-5. Briefly, however, the pulsed signals 135a-d can include a master pulse train. A last, and in some examples, a $9^{th}$ pulse of a master pulse train can utilize 32 state pulse position modulation and contain up to 24 words of data, representing values of chain ID, UTC time, Timing corrections, station locations, and Kalman filter coefficients.

The receiving target 140 comprises a receiver (e.g., the receiver 600 of FIG. 6) that receives the pulsed signals 135a-d. Using the pulsed signals 135a-d, the receiving target 140 determines PNT information. For example, each of virtual transmitters 130a-d transmits the pulsed signals 135a-d at precise time intervals. The receiving target's receiver measures the time difference between a primary pulse signal (e.g., pulse signal 135a) and a secondary pulse signal (e.g., one of the signals 135b-d). A locus of points having the same time difference between the primary virtual transmitter 130a and one or more of the secondary virtual transmitters 130b-d describe a curved Line of Position (LOP) (spherical hyperbola) on the surface of the earth. Thus, an intersection of two or more of these LOP determine the position of the receiving target 140.

Once resolved, the PNT information can be available to the target's associated equipment (e.g. ships steerage) via a standard computer interfaces (e.g. USB transmitting Latitude, Longitude and direction of movement data with a 1 pulse per second synchronization marker).

Figure 2:
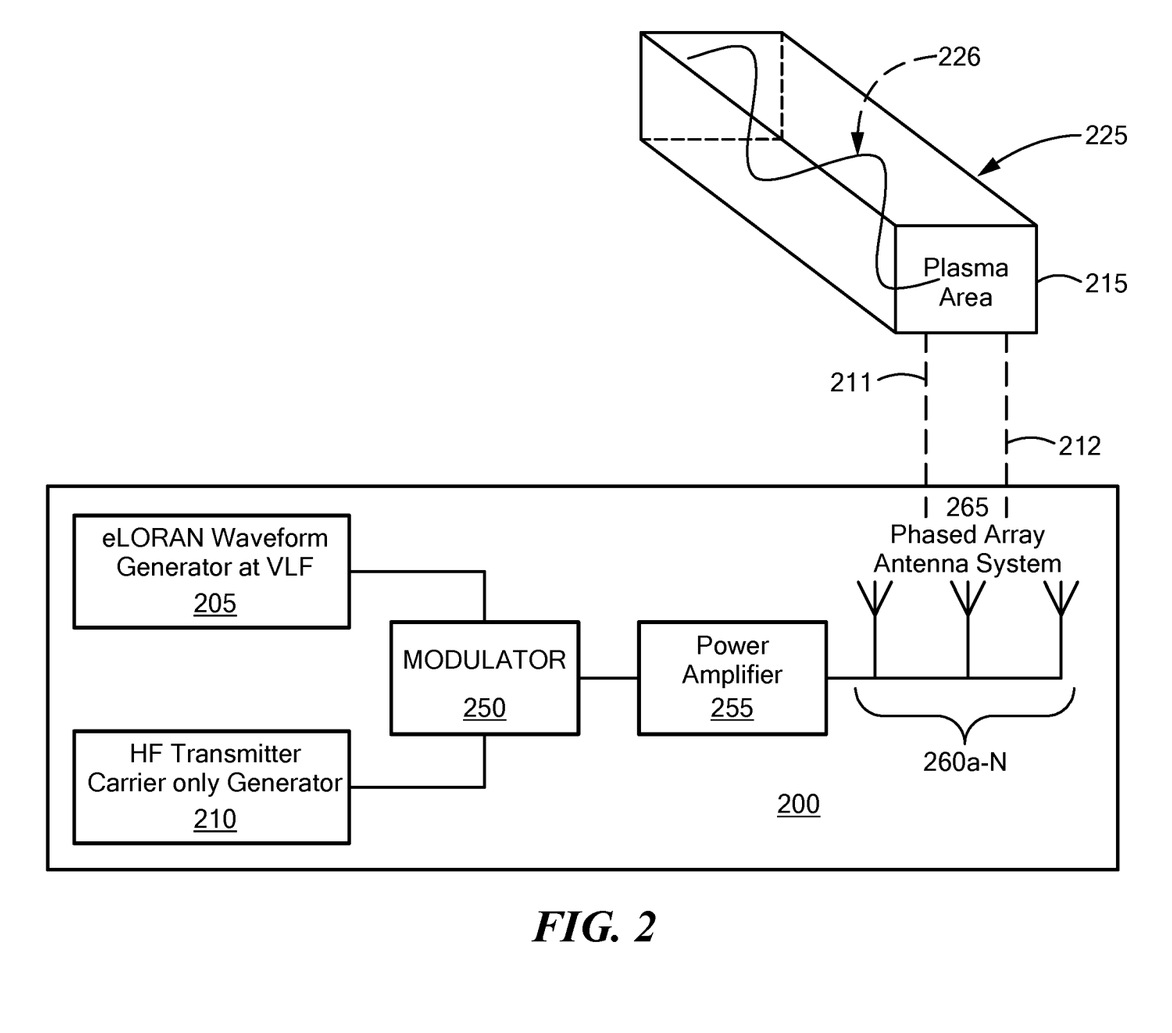
FIG. 2 is a block diagram of a transmitter configured to create virtual transmitters according to embodiments described herein.

FIG. 2 is a block diagram of an ionospheric transmitter 200 configured to create virtual transmitters (e.g., the virtual transmitters 130a-d of FIG. 1). The ionospheric transmitter 200 comprises a waveform generator 205, a high-frequency (HF) carrier signal generator, a modulator 250, a power amplifier, and a phased array antenna system 265 that includes a plurality of radiating elements 260a-N.

The HF carrier signal generator generates an HF carrier signal 211 that is modulated by modulator 250 and amplified by power amplifier 255. The phased array antenna system 265, utilizing beam steering, transmits the HF carrier signal 211 to heat up a plasma area 215, which is in the ionosphere, to generate an ionization duct 225. A frequency and amplitude of the HF carrier signal 211 are chosen based upon a total electron content of the area to be ionized and needed height above ground to establish the duct 225.

Figure 4:
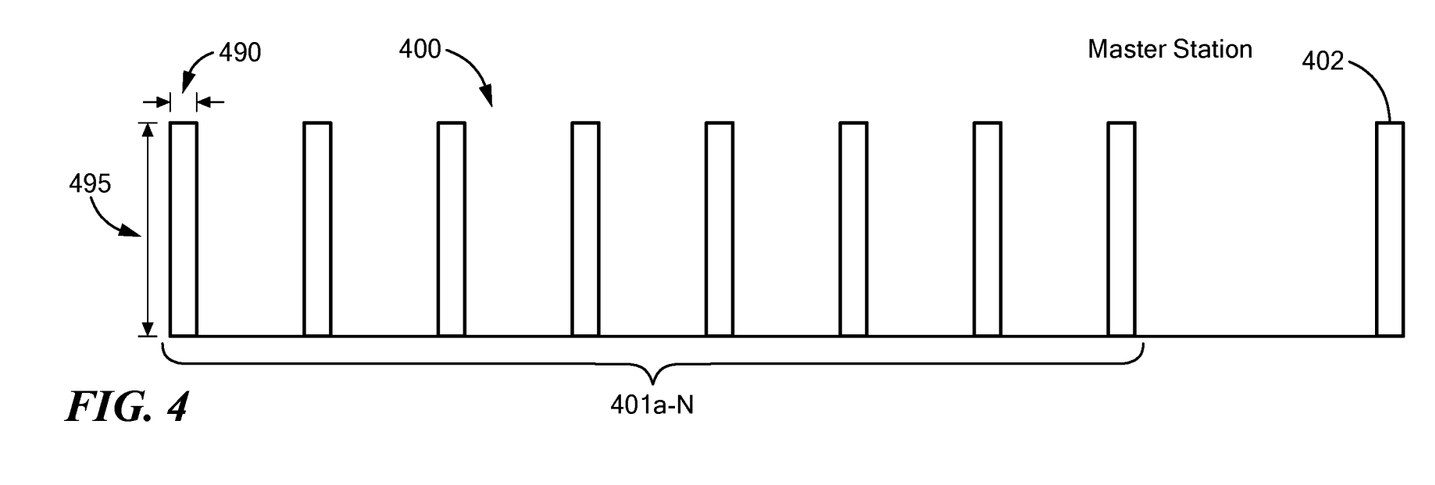
FIG. 4 illustrates a waveform of a master virtual transmitter according to embodiments described herein.
Figure 5:
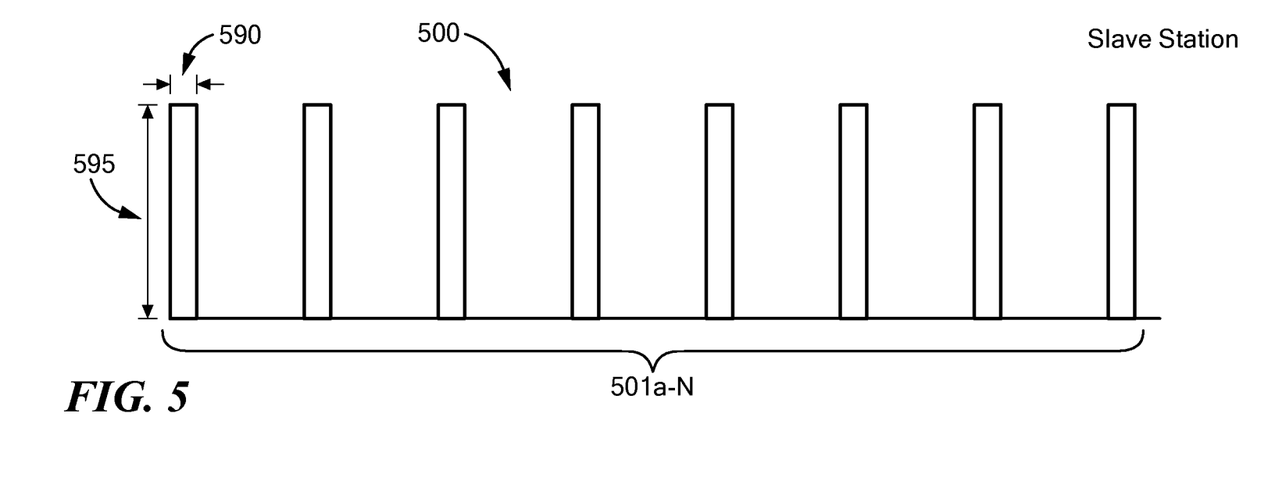
FIG. 5 illustrates a waveform of one or more secondary virtual transmitter according to embodiments described herein.

In embodiments, the modulator 250 can be used to mix/combine a VLF signal generated by the waveform generator 205 with the HF carrier signal. The VLF signal, represented and discussed in greater detail with respect to FIGS. 4-5 are used as either a master (e.g., primary) or slave (e.g., secondary) station pulse chain. Additionally, a last pulse of the master pulse train can contain 32 state pulse position modulation and up to 24 words of data, representing values of chain ID, UTC time, Timing corrections, station locations, and Kalman filter coefficients.

Using the antenna array 265, phases of the antenna elements 260a-N are adjusted to electronically "steer" the HF carrier signal 211 to a point in the ionosphere needed to have the duct 225 impact a certain point on the earth's surface. In embodiments, the elements used to "steer" the duct 225 to the desired position on the earth are the angle of the signal and the height above ground of the ionization area.

The ionospheric transmitter 200 receives a carrier feedback signal 212 which indicates that the plasma area 215 is stable and the ionospheric duct 225 has been generated. The transmitter 200 can receive and evaluate the feedback 212 in a manner similar to that used to measure the VSWR (Voltage Standing Wave Ratio) in any standard feedline. The feedback signal 212 can provide an indication of a stable area when the feedback signal 212 includes a minimum threshold amount of power. Once the plasma area 215 is stable, the waveform generator 205 generates a waveform 226 which is transmitted through the ionospheric duct 225. The ionospheric duct 225 is created as a parallel-plane waveguide and thus provides a pathway or guides the VLF signal of waveform 226 with minimal loss of energy.

The waveform 226 impinges the earth's surface such that it creates a virtual transmitter (e.g., one of the virtual transmitters 130a-d of FIG. 1). For example, the waveform 226 is generated by modulating, using modulator 250, the HF carrier signal 211 which is propagated through the duct 225. The waveform 226 is within the low frequency (LF) or very low frequency (VLF) ranges (e.g., 10-500 KHz). Advantageously, the LF and VLF bands are not influenced by propagation issues as are higher frequencies (e.g., 1.5 to 60 MHz) since LF and VLF signals are primarily ground wave. Ground wave, also referred to as surface wave, signals travel along the ground/sea are not reflected off the ionosphere. Additionally, ground waves suffer negligible dispersion. Furthermore, LF/VLF frequencies are relatively unaffected by solar/geomagnetic disturbances and have excellent propagation characteristics during the day or night.

Figure 3:
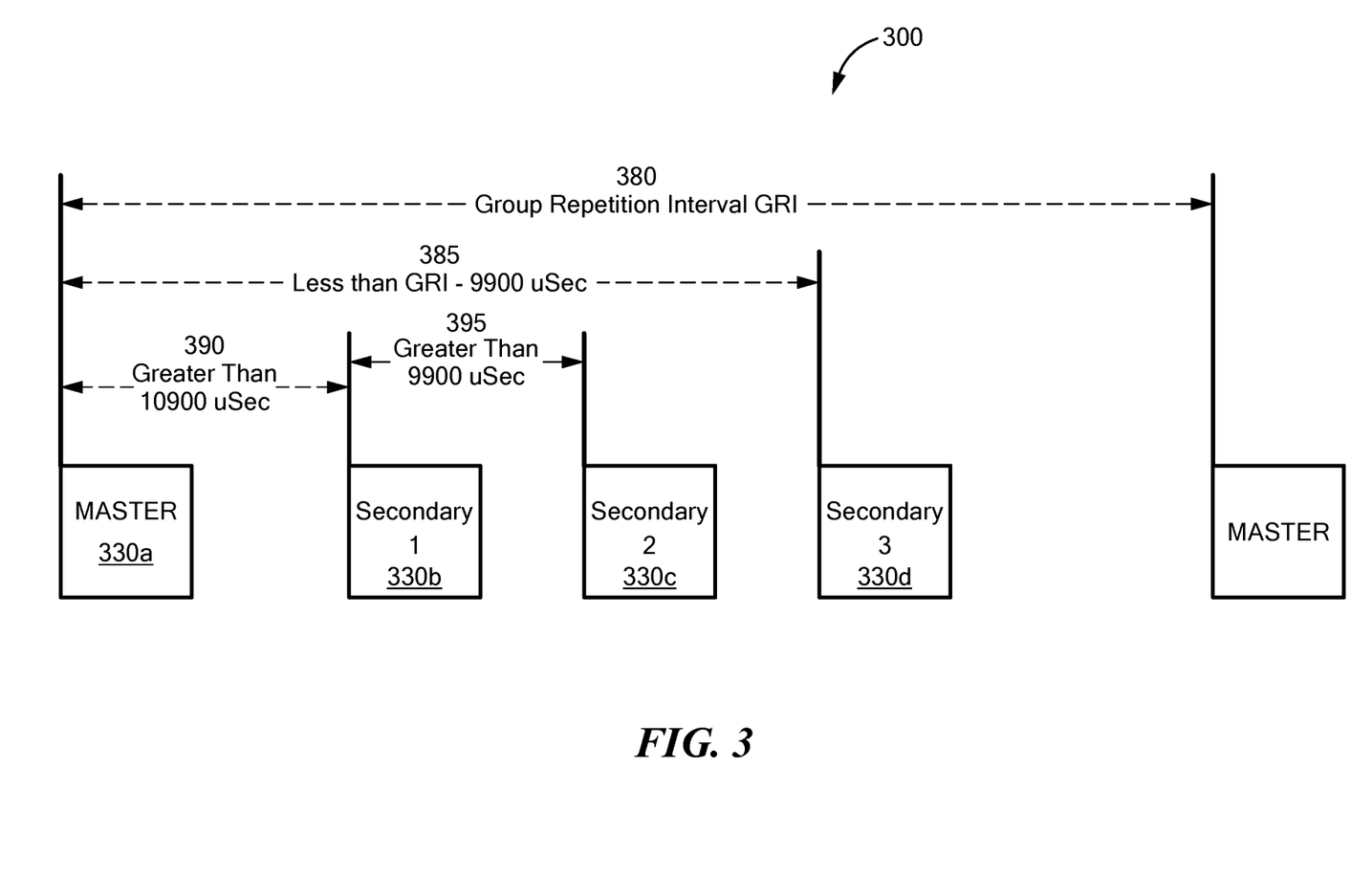
FIG. 3 is a timing diagram of a primary and secondary virtual transmitters according to embodiments described herein.

FIG. 3 is a communications timing diagram 300 of a primary virtual transmitter 330a and multiple secondary virtual transmitters 330b-d. The virtual transmitters 330a-d are positioned to provide Position, Navigation and Timing (PNT) information in a selected area. Each of the virtual transmitters 330a-d transmits a PNT signal pulse within a group repetition interval 380. Accordingly, a receiver (e.g., the receiver 600 of FIG. 6) can measure a time difference between a primary pulse signal (e.g., pulse signal 135a of FIG. 1) and a secondary pulse signal (e.g., one of the signals 135b-d of FIG. 1). As shown in FIG. 2, a locus of points having the same time difference between the primary virtual transmitter 130a and one or more of the secondary virtual transmitters 130b-d describe a curved Line of Position (LOP) (spherical hyperbola) on the surface of the earth. Thus, an intersection of two or more of these LOP determine the position of the receiver.

Specifically, the virtual transmitters 330a-d transmit pulses according to a repetition timing between a start of their respective pulse trains within a Group Repetition Interval (GM) 380. For example, the GM can have a duration of between 33,000 and 100,000 microseconds. In some embodiments, a start of the primary virtual transmitter's (e.g., master) pulse train within respect to a start of each secondary virtual transmitter's (e.g., slave) pulse train has a duration that have a delay duration sufficient to allow for the propagation of the signal between the master and the slave. As shown in FIG. 3, each virtual transmitter 330a-d can have a delay between the master station 330a and each slave or secondary station 330b, 330c, 330d.

FIG. 4 illustrates an example pulse train 400 of a primary virtual transmitter (e.g., the primary virtual transmitter 330a of FIG. 3). The pulse train 400 comprises a plurality of pulses 401a-N, 402. In example embodiments, the pulse train 400 can be between 1.42 and 2.4 seconds. In some examples, each pulse width 490 is about 200 uSecs and timing between each of the pulses 401a-N is about 1000 uSec. In further embodiments, a timing between the pulse 401N and the additional pulse 402 is about 200 uSec. Each of the pulses 401a-N, 402 can have a frequency range 495 between 200 and 1000 uSec.

In embodiments, the pulse train 400 can comprise pulse durations and timing used to compute a receiver's (e.g., target 140 of FIG. 1) position based upon the propagation delay, time of arrival, between the master signal from the master transmitter and the slave signals from each secondary station.

The pulse train of the master station 400 carries messages such as station location, signal timing and phasing correction. Because the pulse train 400 is a primary pulse train, it includes an additional pulse 402 having a message with information, such as corrections for signal propagation within an ionospheric duct (e.g., one of the ducts 120a-d of FIG. 1), latitude and longitude of a source virtual transmitter (i.e., the source transmitter of the pulse train 400), which in this case is a primary virtual transmitter, and Kalman filtering coefficients.

FIG. 5 illustrates an example pulse train 500 that is transmitted by one or more secondary virtual transmitter (e.g., secondary virtual transmitters 130b-d of FIG. 1). The pulse train 500 is substantially similar to the pulse train 400 of FIG. 4, but does not include an additional pulse (e.g., pulse 402).

The pulse train 500 comprises a plurality of pulses 501a-N. The pulse train 500 can be between 1.42 and 2.4 seconds. In some examples, each pulse width 590 is about 200 uSecs and the timing between each of the pulses 501a-N is about 1000 uSec. Each of the pulses 501a-N can have a frequency range 595 between 200 and 1000 uSec. The pulse train 500 for secondary stations can comprise 8 pulses and have pulse durations and timing used to compute a target's position based upon the propagation delay, time of arrival, between the master signal and the slave signal from each secondary station.

It is understood that any suitable pulse train can be used to meet the needs of a particular application. Pulse trains can include any practical number of pulses to convey a wide range of information.

Figure 6:
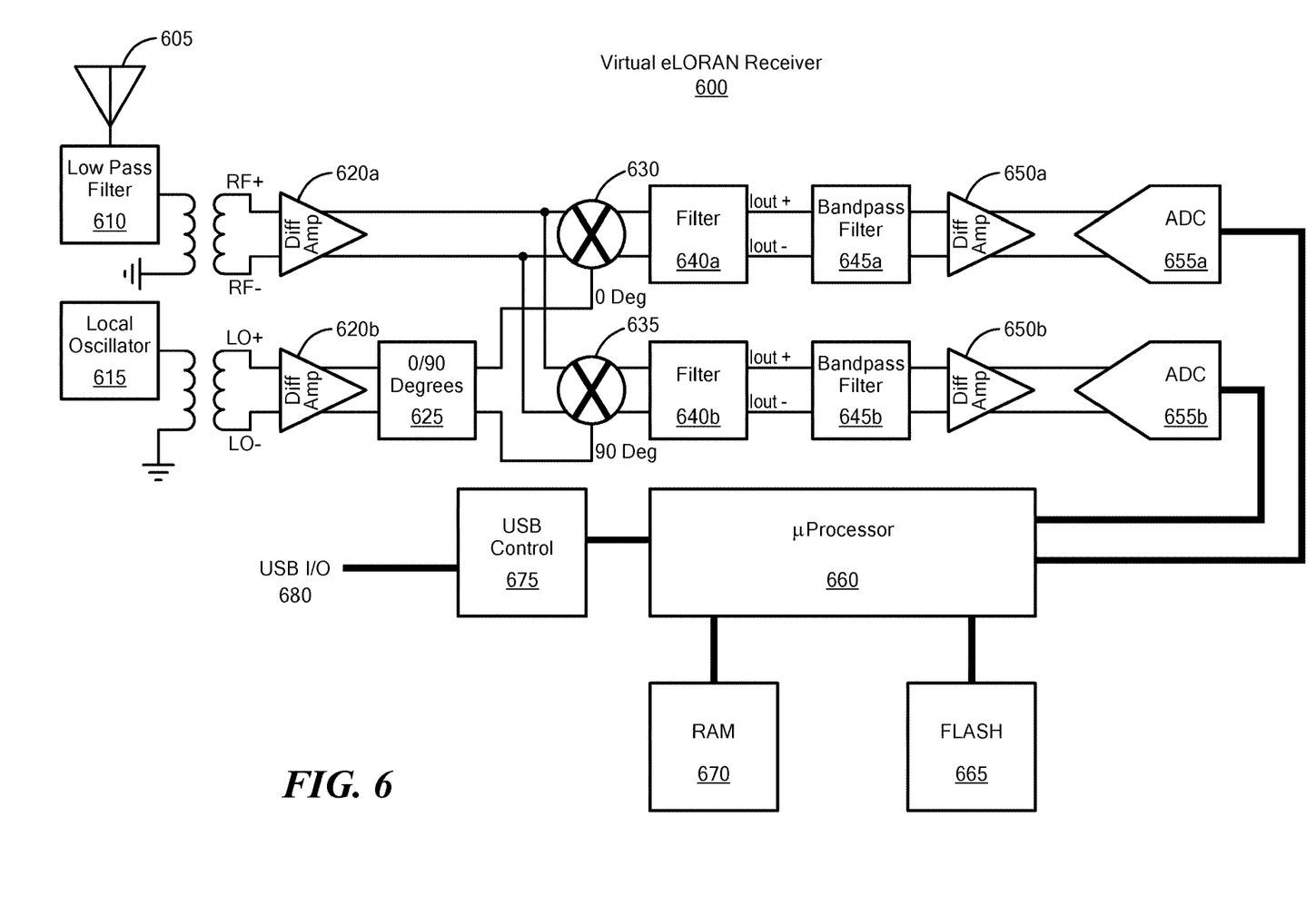
FIG. 6 is a block diagram of a receiver configured to receive transmissions from virtual transmitters according to embodiments described herein.

FIG. 6 is a block diagram of a receiver 600 configured to receive pulse train transmissions (e.g., pulse train 400 of FIG. 4 and pulse train 500 of FIG. 5) from virtual transmitters (e.g., virtual transmitters 330a-d of FIG. 3). The receiver 600 is configured to process the pulse train transmissions to determine PNT information. For example, the receiver 600 measures a time difference between a primary pulse train transmission (e.g., pulse signal 135a of FIG. 1) and a secondary pulse train transmission (e.g., one of the signals 135*b-d* of FIG. 1). A locus of points having the same time difference between a primary virtual transmitters 130*a* and one or more of the secondary virtual transmitters describe a curved Line Of Position (LOP) (spherical hyperbola) on the surface of the earth. Thus, an intersection of two or more of these LOP determine the position of the receiver 600.

The receiver 600 comprises a receiver element 605 that receives the pulse train transmissions. A low pass filter is coupled to the receiver element 605 and filters the pulse train transmissions. The local oscillator 615 provides a reference signal which is provided to a differential amplifier, the orthogonal outputs of that signal at zero and 90 degrees are provided to the mixers 630 and 635 used to demodulate in In-phase and Quadrature (I/Q) signals. Each of the differential amplifiers, 620*a-b*, are used to provide amplification of the input signals, and their inherent properties of common-mode rejection and low harmonic distortion and phase matching provide efficient output drive for complementary outputs. Mixers 630, 635 isolate in-phase and quadrature signals from the pulse train transmissions. The filters 640*a-b* are configured to remove aliasing signals from the pulse train transmissions, and band-pass filters 645*a-b* are configured to pass a narrow (less than 3 KHz) range of frequencies with a center frequency that is the same as that used for the pulse and data information. The output differential amplifiers, 650*a-b*, provide scaled, differential output levels which are input to the analog-to-digital converters, 655*a-b*. Analog-to-Digital converters 655*a-b* convert analog in-phase and quadrature phase components of the received pulse train transmissions for use by micro-processor 660. Micro-processor 660 comprises RAM 670 and FLASH 665 that collectively store logic to process the received pulse train transmissions. USB control 675 is a representative input and output port that would be used to receive configuration and control information from a connected system and to provide outputs of the PNT data.

In embodiments, the receiver 600 operates as a hyperbolic navigation system. For example, the receiver 600 functions by measuring the time differences in reception of signals from the master and secondary transmitters. Since the location of the master and each secondary station is known, this time difference creates a locus of points of constant difference, a hyperbola. Since a separate hyperbola is defined for the time difference between each of the secondary and the master stations, the intersection of all these hyperbolas is the position of the receiver. However, since the Earth is not flat, and propagation is not uniform over land and seawater correction factor information is used to improve positional accuracy. Additionally, Kalman filter coefficients and data that are also transmitted on the 9th pulse of the master stations sequence (e.g., pulse train 400 of FIG. 4) to provide the algorithm for the measurement information over time needed to produce a more accurate geographical position for the master and each secondary station, thus improving the accuracy of the overall resulting positional computation. This data is needed because, unlike physical LORAN and eLORAN systems, which have a very precise position on the Earth, the receiver 600 receives signals from virtual master and secondary stations, that are the result of ionospheric ducting, and thus are not 100% fixed. The correction data for this instability is generated based upon the feedback or returned signal on the original ionization carrier wave used for each virtual transmitter.

Figure 7:
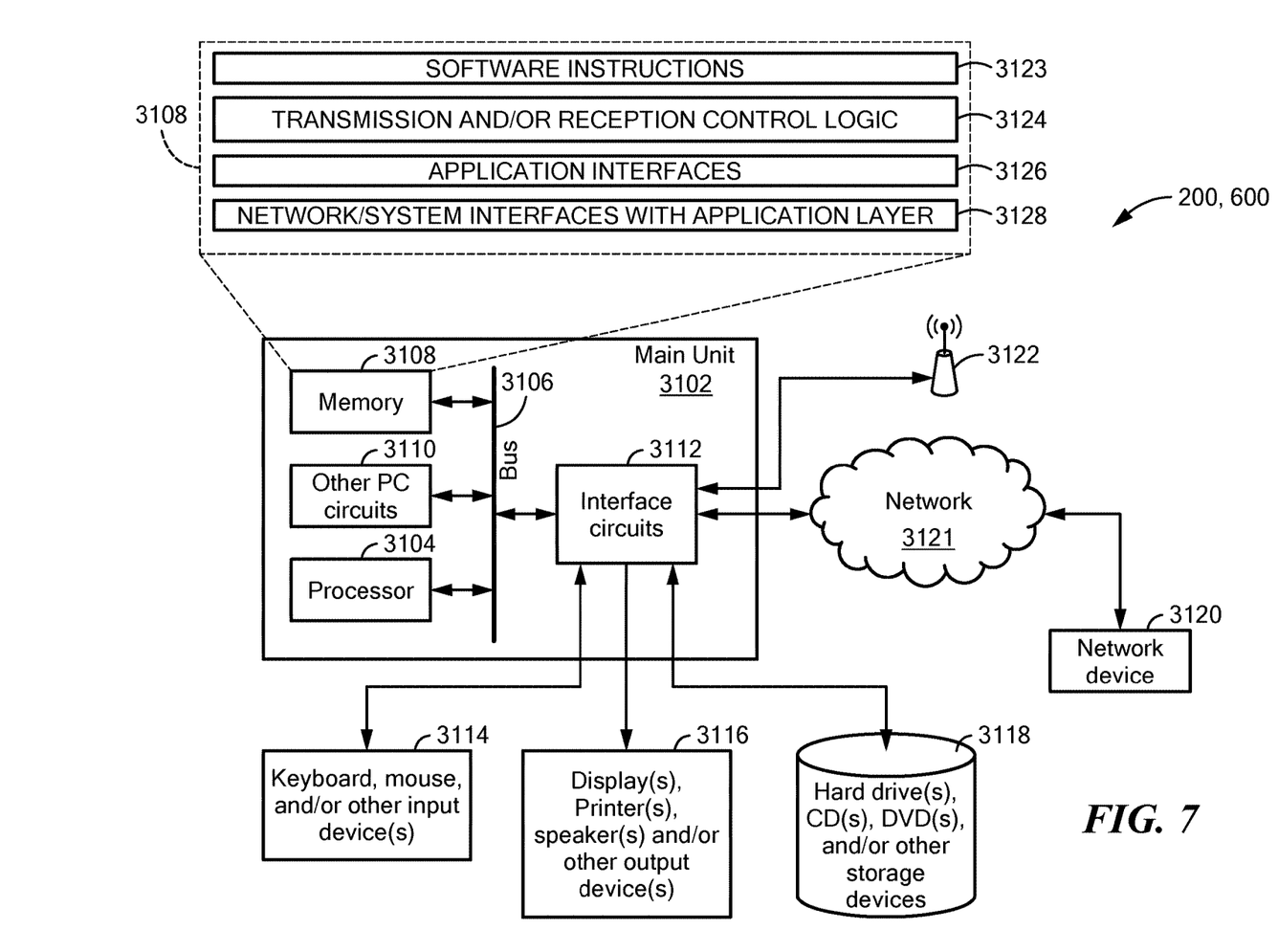
FIG. 7 is a detailed block diagram of electrical systems of a computing device according to embodiments described herein.

FIG. 7 illustrates a detailed block diagram of electrical systems of an example computing device which may be used to carry out the functions of the transmitter 200 of FIG. 2 and/or the receiver 600 of FIG. 6. In this example, the computing device 200, 600 includes a main unit 3102, which preferably includes one or more processors 3104 communicatively coupled by an address/data bus 3106 to one or more memory devices 3108, other computer circuitry 3110, and one or more interface circuits 3112. The processor 3104 may be any suitable processor, such as a microprocessor from the INTEL PENTIUM® or CORE™ family of microprocessors. The memory 3108 preferably includes volatile memory and non-volatile memory. Preferably, the memory 3108 stores a software program that interacts with the other devices in the environment 100, as described above. This program may be executed by the processor 3104 in any suitable manner. In an example embodiment, memory 3108 may be part of a "cloud" such that cloud computing may be utilized by the computing device 200, 600. The memory 3108 may also store digital data indicative of documents, files, programs, webpages, patient samples, metadata, and/or medical electronic data as described above retrieved from (or loaded via) the computing device 200, 600.

The example memory devices 3108 store software instructions 3123, transmission and/or reception control logic 3124, application interfaces 3126, user interface features, permissions, protocols, identification codes, content information, registration information, event information, and/or configurations. The memory devices 3108 also may store network or system interface features, permissions, protocols, configuration, and/or preference information 3128 for use by the computing device 200, 600. It will be appreciated that many other data fields and records may be stored in the memory device 3108 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 3112 may be implemented using any suitable interface standard, such as an Ethernet interface and/or a Universal Serial Bus (USB) interface. One or more input devices 3114 may be connected to the interface circuit 3112 for entering data and commands into the main unit 3102. For example, the input device 3114 may be a keyboard, mouse, touch screen, track pad, track ball, image sensor, character recognition, barcode scanner, microphone, and/or a speech or voice recognition system.

One or more displays, printers, speakers, and/or other output devices 3116 may also be connected to the main unit 3102 via the interface circuit 3112. The display may be a cathode ray tube (CRTs), a liquid crystal display (LCD), or any other type of display. The display generates visual displays generated during operation of the computing device 200, 600. For example, the display may provide a user interface and may display one or more webpages received from the computing device 200, 600. A user interface may include prompts for human input from a user of the computing device 200, 600 including links, buttons, tabs, checkboxes, thumbnails, text fields, drop down boxes, etc., and may provide various outputs in response to the user inputs, such as text, still images, videos, audio, and animations.

One or more storage devices 3118 may also be connected to the main unit 3102 via the interface circuit 3112. For example, a hard drive, CD drive, DVD drive, and/or other storage devices may be connected to the main unit 3102. The storage devices 3118 may store any type of data, such as the electronic data described herein, which may be used by the computing device 200, 600.

The computing device 200, 600 may also exchange data with other network devices 3120 via a connection to a network 3121 (e.g., the Internet) or a wireless transceiver 3122 connected to the network 3121. Network devices 3120 may include one or more servers, which may be used to store certain types of data, and particularly large volumes of data which may be stored in one or more data repository. A server may process or manage any kind of data including databases, programs, files, libraries, identifiers, etc. A server may store and operate various applications relating to receiving, transmitting, processing, and storing the large volumes of data. It should be appreciated that various configurations of one or more servers may be used to support, maintain, or implement the computing device 200, 600 of the PNT system 100. For example, servers may be operated by various entities, including operators of GPS, satellite communications systems, terrain-based communications systems, etc. Also, certain data may be stored in the computing device 200, 600 which is also stored on a server, either temporarily or permanently, for example in memory 3108 or storage device 3118. The network connection may be any type of network connection, such as an Ethernet connection, digital subscriber line (DSL), telephone line, coaxial cable, wireless connection, etc.

Access the computing device 200, 600 can be controlled by appropriate security software or security measures. An individual third-party client or consumer's access can be defined by the computing device 200, 600 and limited to certain data and/or actions. Accordingly, users of the PNT system 100 may be required to register with the computing device 200, 600.

Comprise, include, and/or plural forms of each are open ended and include the listed parts and can include additional parts that are not listed. And/or is open ended and includes one or more of the listed parts and combinations of the listed parts.

One skilled in the art will realize the invention(s) may be embodied in other specific forms without departing from the spirit or essential characteristics thereof. The foregoing embodiments are therefore to be considered in all respects illustrative rather than limiting of the invention(s) described herein. Scope of the invention(s) is thus indicated by the appended claims, rather than by the foregoing description, and all changes that come within the meaning and range of equivalency of the claims are therefore intended to be embraced therein.

What is claimed is:

1. A method comprising:
    receiving radio-frequency (RF) signals from a plurality of virtual transmitters; and
    determining position, navigation, and timing (PNT) information of a target object based on information obtained from the RF signals,
        wherein, the plurality of virtual transmitters are generated using a plurality of ionospheric ducts, and, wherein the ionospheric ducts are generated using a high-frequency (HF) carrier signal having a predetermined frequency and amplitude.

2. The method of claim 1 wherein a number of virtual transmitters are selected to enclose a geographic area in which PNT information is to be provided.

3. The method of claim 1 wherein each virtual transmitter is associated with a distinct ionospheric duct.

4. The method of claim 1 wherein the predetermined frequency and amplitude is selected to heat a plasma area in which the ionospheric ducts are generated.

5. The method of claim 4 wherein a waveform is transmitted through one of the ionospheric ducts, and wherein one of the RF signals includes the waveform and the waveform includes the PNT information.

6. The method of claim 5 wherein the plurality of virtual transmitters comprises a virtual primary transmitter and one or more virtual secondary transmitters.

7. The method of claim 6 wherein the waveform corresponding to the virtual primary transmitter comprises a series of pulses, wherein one of the pulses is modulated to include PNT data.

8. The method of claim 7 wherein the PNT data comprises one or more of: station ID, UTC time, timing corrections, and virtual transmitter locations.

9. A system for providing position, navigation, and timing (PNT) information, the system comprising:
    a transmitter configured to generate a plurality of virtual transmitters to transmit radio-frequency (RF) signals that include PNT information; and
    a receiver configured to determine position, navigation, and timing (PNT) information of a target object based on the PNT information,
    wherein the transmitter is configured to generate the plurality of virtual transmitters using a plurality of ionospheric ducts, wherein the transmitter comprises:
        a high-frequency (HF) carrier generator configured to generate an HF carrier signal having a predetermined frequency and amplitude; and
        an antenna system configured to transmit the HF carrier signal to generate a subject ionospheric duct.

10. The system of claim 9 wherein the HF carrier generator is further configured to control a phase of the antenna system to steer the HF carrier signal such that the subject ionospheric duct impacts a predetermined point on earth, wherein the predetermined point corresponds to a location of one of the virtual transmitters.

11. The system of claim 10 wherein predetermined points on earth for the plurality of virtual transmitters are selected to enclose a geographic area in which PNT information is to be provided.

12. The system of claim 11 wherein the predetermined frequency and amplitude are selected to heat a plasma area in which the subject ionospheric duct is generated.

13. The system of claim 12 wherein the transmitter further comprises a waveform generator configured to generate a waveform that includes the PNT information; and wherein the antenna system is further configured to transmit the waveform through one of the ionospheric ducts.

14. The system of claim 13 wherein the plurality of virtual transmitters comprises a virtual primary transmitter and one or more virtual secondary transmitters.

15. The system of claim 14 wherein the waveform corresponding to the virtual primary transmitter comprises a series of pulses, wherein one of the pulses is modulated to include PNT data.

16. A transmitter comprising:
    a high-frequency (HF) carrier generator configured to generate an HF carrier signal having a predetermined frequency and amplitude;
    a waveform generator configured to generate a waveform that includes PNT information; and
    an antenna system configured to transmit the HF carrier signal to generate a subject ionospheric duct that impacts a predetermined point on earth to generate a virtual transmitter, the antenna system further configured to transmit the waveform through the ionospheric duct which is transmitted to a target object by the virtual transmitter.

* * * * *